United States Patent [19]

Saruyama

[11] Patent Number: 5,300,612
[45] Date of Patent: Apr. 5, 1994

[54] MODULUS CONTROLLABLE ROOM-TEMPERATURE-CURABLE SILICONE ELASTOMER COMPOSITION

[75] Inventor: Toshio Saruyama, Chiba, Japan

[73] Assignee: Dow Corning Toray Silicone Co., Ltd., Tokyo, Japan

[21] Appl. No.: 78,535

[22] Filed: Jun. 17, 1993

[30] Foreign Application Priority Data

Jun. 22, 1992 [JP] Japan .................................. 4-187661

[51] Int. Cl.⁵ .............................................. C08G 77/06
[52] U.S. Cl. ........................................ 528/17; 528/18; 528/21; 528/15
[58] Field of Search ........................ 528/17, 18, 21, 15

[56] References Cited

U.S. PATENT DOCUMENTS

| | | | |
|---|---|---|---|
| 3,308,148 | 0/1967 | Hahn et al. | 260/448.2 |
| 4,100,129 | 7/1978 | Beers | 260/37 SB |
| 4,143,088 | 3/1979 | Favre et al. | 260/825 |
| 4,687,829 | 8/1987 | Chaffee et al. | 528/17 |
| 5,053,442 | 10/1991 | Chu et al. | 523/212 |

FOREIGN PATENT DOCUMENTS

| | | |
|---|---|---|
| 2000371 | 10/1989 | Canada . |
| 83167 | 4/1988 | Japan . |

OTHER PUBLICATIONS

Chemical Abstracts, vol. 63, No. 8, Oct. 11, 1965, Columbus, Ohio US, Abstract No. 1012h1, Borisov et al., Synthesis of polysiloxanes, containing tri methylsiloxy end groups by the method of heterocondensation.

*Primary Examiner*—Melvyn I. Marquis
*Attorney, Agent, or Firm*—Roger H. Borrousch

[57] ABSTRACT

A room-temperature-curable silicone elastomer composition that is highly workable prior to its cure and that cures to give a silicone elastomer having a desirable stiffness is made from a silanol-terminated polydiorganosiloxane, a dialkoxysiloxane of the formula

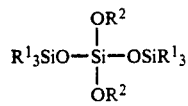

where $R^1$ represents monovalent hydrocarbon groups and $R^2$ represents monovalent hydrocarbon groups having 1 to 8 carbon atoms, a tri- or tetra-alkoxysilane, and a curing catalyst.

12 Claims, No Drawings

MODULUS CONTROLLABLE ROOM-TEMPERATURE-CURABLE SILICONE ELASTOMER COMPOSITION

BACKGROUND OF THE INVENTION

1. Technical Field

The present invention relates to a composition that cures at room temperature to give silicone elastomer. More specifically, the present invention relates to a composition that cures at room temperature to give silicone elastomer whose postcure physical properties can be varied over a broad range.

2. Prior Art and Problems Therein

Compositions that cure at room temperature to give silicone elastomer are already known and have already entered into use in a wide range of industrial sectors. The mechanisms underlying their room-temperature cure include the hydrosilylation reaction, ultraviolet-based curing, and curing based on the condensation reaction between the silanol group and silicon-bonded functional groups. Among these, silicone elastomer compositions that cure by a condensation reaction mechanism offer the following features ready development of adhesiveness at room temperature, resistance to cure inhibition by contaminants that might be present in the curing environment, brief cure time obtained by simply mixing the base and catalyst, long-term storage stability as the single-package composition, and development of cure by simply standing in the atmosphere. As a result of these features, such silicone elastomer compositions have entered into broad use as adhesives, coatings, and sealants.

However, a problem associated with these particular compositions is that limitations are imposed on their post-cure mechanical properties as a result of the requirement that they exhibit pre-cure workability, i.e., in mixing, placement, and finishing by manual procedures. In specific terms, because the molecular weight of the polydiorganosiloxane main component must be held below a certain level in order to facilitate workability, it becomes essentially impossible to reduce the elastomer's postcure stiffness (as represented by such properties as the Durometer hardness and modulus) below a certain level.

The simplest method for solving this problem consists of the addition of unreactive polydiorganosiloxane. The problem with this method is that the unreactive polydiorganosiloxane additive bleeds onto the surface after curing and impairs the adhesiveness.

A fundamental strategy for solving this problem consists of the use of both polyfunctional crosslinker and difunctional chain extender. The polydiorganosiloxane then undergoes both crosslinking and chain extension during the crosslinking reaction and the post-cure crosslink density is thereby reduced.

The following two methods have been proposed within the sphere of this fundamental strategy:

(1) the addition of siloxane bearing two N,N-dialkylaminoxy groups in each molecule and siloxane bearing at least three N,N-dialkylaminoxy groups in each molecule, and (2) the addition of silane bearing two N-alkylacetamido groups in each molecule and either silane bearing at least three N-alkylacetamido groups in each molecule or siloxane bearing at least three N,N-dialkylaminoxy groups in each molecule.

Nevertheless, these methods still suffer from problems.

In the case of the first method, the use of the N,N-dialkylaminoxy group results in the generation of N,N-dialkylhydroxylamine by-product by the curing reaction. This creates the problem of an unpleasant hydroxylamine odor. In addition, as a result of the strong basicity of hydroxylamines, even a slight elevation in ambient temperature results in the critical problem of cure inhibition due to polydiorganosiloxane scission. Finally, this method is economically disadvantageous because N,N-dialkylaminoxy-containing siloxane is expensive.

In the case of the second method, the use of the N-alkylacetamido group again creates an odor problem due to the N-alkylacetamide produced as by-product during cure. Another drawback to the use of the N-alkylacetamido group is the occurrence of substitution reactions to give, e.g., the alkoxy group, when an active hydrogen-containing compound, e.g., alcohol, is present in the ambient. This also causes cure inhibition. Finally, this method is also rendered economically disadvantageous by the expense of N-alkylacetamido-containing silane.

It has otherwise been proposed that chain extension and crosslinking be conducted using functional groups that are already in wide application and that do not cause secondary reactions. This approach avoids the use of special, expensive functional groups as are used in the two methods discussed above. Japanese Patent Application Laid Open [Kokai or Unexamined] Number Sho 63-83167 [83,167/1988], assigned to Toray Silicone KK, proposes a method that uses, for example, $RNHCH_2MeSi(OMe)_2$, as chain extender. However, this method cannot be applied at a practical level because it is extremely difficult to economically synthesize this chain extender and because it is difficult to strike a stable balance with the crosslinker.

Problems to Be Solved by the Invention

As a consequence of extensive investigations in order to solve the aforementioned problems, the present inventor has solved these problems through the use of a particular type of difunctional chain extender. The present invention takes as its object the introduction of a room-temperature-curable silicone elastomer composition that exhibits an excellent pre-cure workability and that cures to give silicone elastomer with a desirable stiffness.

SUMMARY OF THE INVENTION

The present invention relates to a modulus controllable room-temperature-curable silicone elastomer composition consists essentially of (a) 100 parts by weight silanol-terminated polydiorganosiloxane that has a viscosity at 25° C. of 0.0005 to 0.3 m²/s, (b) 0.5 to 20 parts by weight of a siloxane with the formula

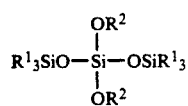

where $R^1$ represents monovalent hydrocarbon groups and $R^2$ represents monovalent hydrocarbon groups having 1 to 8 carbon atoms, (c) 0.5 to 20 parts by weight organosilane with the formula $R^1{}_{4-n}Si(OR^2)_n$ where $R^1$ and $R^2$ are defined as above and n is 3 or 4 or partial hydrolyzate thereof, and (d) 0.01 to 20 parts by weight curing catalyst.

DETAILED DESCRIPTION OF THE PREFERRED EMBODIMENTS

The polydiorganosiloxane of component (a) is the base component of the composition of the present invention, and it must be endblocked with silanol groups. Its pendant organic groups consist of monovalent unsubstituted and substituted hydrocarbon groups, and these are specifically exemplified by alkyl groups such as methyl and ethyl; aryl groups such as phenyl; haloalkyl groups such as 3,3,3-trifluoropropyl; and alkenyl groups such as vinyl. The viscosity of this component must be 0.0005 to 0.3 m²/s at 25° C. The post-cure mechanical strength will be too low for practical applications when the viscosity is below 0.0005 m²/s while the pre-cure workability will be substantially impaired at viscosities in excess of 0.3 m²/s. This polydiorganosiloxane may contain a relatively small amount of branching, but branching should be kept as low as possible in order to have the post-cure physical properties of the silicone elastomer fall within desirable ranges.

The siloxane having 2 hydrolyzable groups that is component (b) of the present invention functions as a chain extender for component (a). This siloxane has the formula

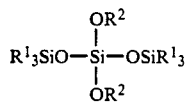

in which $R^1$ represents monovalent hydrocarbon groups and $R^2$ represents monovalent hydrocarbon groups having 1 to 8 carbons. $R^1$ is ordinarily the methyl group, but a portion of $R^1$ may as desired consist of hydrocarbon groups having 2 or more carbons. Methyl, ethyl, and n-propyl are typically used for $R^2$, and this group should be selected based on considerations of the cure rate and other factors. Unsaturated monovalent hydrocarbon groups may also be used for $R^2$. Component (b) is specifically exemplified by

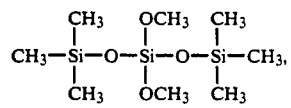

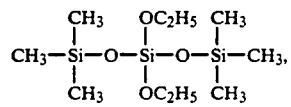

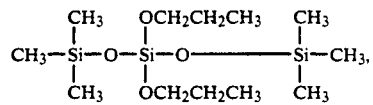

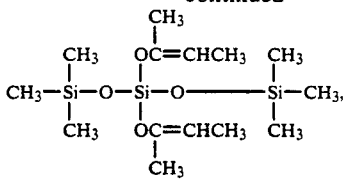

Although the quantity of component (b) should be determined based on considerations of the balance with component (c) in view of the post-cure properties required of the silicone elastomer, the quantity of silanol in component (a), the use of admixtures other than components (a) through (d), and the impurities, such as water, present in said other admixtures, the addition of component (b) must in any case fall within the range of 0.5 to 20 parts by weight per 100 parts by weight component (a). When less is added, curing will be inadequate and a desirable softness cannot be obtained. The use of more than 20 parts by weight is associated with such problems as a too slow cure or an incomplete cure.

Component (c) used by the present invention functions as a crosslinker for component (a). This crosslinker comprises organosilane with the formula $R^1{}_{4-n}Si(OR^2)_n$ in which $R^1$ and $R^2$ are defined as above and n is 3 or 4. Component (c) is specifically exemplified by tetramethoxysilane, tetraethoxysilane, tetraisopropoxysilane, methyltrimethoxysilane, vinyltrimethoxysilane, methyltriethoxysilane, phenyltrimethoxysilane, and methyltri(ethoxymethoxy)silane. While component (c) ordinarily consists of a single selection from among such compounds, it may be a combination of two or more selections. The partial hydrolyzates of these compounds can also be used. Although the particular quantity of component (c) should be determined based on considerations of the balance with component (b) in view of the required post-cure properties, the quantity of silanol in component (a), the use of admixtures other than components (a) through (d), and the impurities, such as water, present in said other admixtures, the addition of component (c) must in any case fall within the range of 0.5 to 20 parts by weight per 100 parts by weight of component (a). Curing will be inadequate when less than 0.5 part by weight is added. The use of more than 20 parts by weight is associated with such problems as an incomplete cure.

Component (d) used by the present invention is a catalyst that accelerates the cure among components (a), (b), and (c). Insofar as the functions of the composition of the present invention are not compromised, component (d) may be any catalyst heretofore known for acceleration of the cure of components (a) and (c). Component (d) is exemplified by tin catalysts such as dialkyltin dicarboxylates and tin octoate, iron octoate, zirconium octoate, titanate esters such as tetrabutyl titanate, tetraisopropyl titanate, and dibutoxy-titanium bis(acetylacetonate), and amine catalysts such as tetramethylguanidine, but is not limited to the preceding. Component (d) ordinarily consists of a single compound, but combinations of two or more compounds can be used. Component (d) must be added at 0.01 to 20 parts by weight per 100 parts by weight of component (a). An addition below 0.01 part by weight is insufficient to induce an acceleration of the cure. An addition in excess of 20 parts by weight frequently causes such adverse affects as a loss of water resistance, heat resistance, etc.

The following may be added to the composition of the present invention on an optional basis: low degree-of-polymerization polydiorganosiloxane bearing the silanol group at one or both molecular chain terminals or silanol-free polydiorganosiloxane, to serve as curerate regulator, etc.; inorganic filler such as fumed silica, precipitated silica, quartz micropowder, carbon black, and calcium carbonate and these fillers after a hydrophobing treatment; silicone resin; fluidity regulator; silane or siloxane adhesion promoter; pigment; heat stabilizer; flame retardant; organic solvent; and so forth.

The mixing sequence for components (a) through (d) to give the room-temperature-curable silicone elastomer composition of the present invention preferably consists of the addition of (b), (c), and (d) in the sequence given to component (a) or the simultaneous addition of components (b), (c), and (d) to component (a). Failing this, the desired properties, and particularly post-cure softness, may not be obtained in some cases. Except for this consideration, the mixing sequence is not otherwise specifically restricted.

The post-cure physical properties of the composition of the present invention as described hereinbefore, and particularly such properties as the Durometer hardness and modulus, can be easily controlled or adjusted, for example, to give a low Durometer hardness, high elongation silicone rubber. In addition, the composition of the present invention resists curing inhibition, can easily be held uncured for long periods of time as the single-package composition, and readily manifests adhesiveness. It is therefore specifically useful as an adhesive, coating, sealant, and so forth.

The present invention will be explained below through illustrative examples and comparison examples. In the examples, the viscosity is the value at 25° C, Me represents the methyl group, and Et represents the ethyl group.

EXAMPLES 1, 2, and 3

500 g silanol-terminated polydimethylsiloxane (viscosity =0.012 m²/s) was thoroughly mixed with 10 g silanol-terminated polydimethylsiloxane (viscosity =0.00001 m²/s) and 500 g colloidal calcium carbonate. The following were then mixed into the resulting blend in the proportions reported in Table 1 to give room-temperature-curable silicone elastomer compositions: tetra-n-propoxysilane (NPOS),

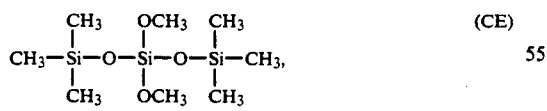
(CE)

and dibutyltin dilaurate (tin catalyst) These compositions were measured for their snap time (time required to develop rubbery elasticity at room temperature). The compositions were also cured at room temperature for 2 weeks and their physical properties were then measured in accordance with JIS K 6301. These measurement results were as reported in Table 1. In addition, the individual compositions were coated on aluminum panels and cured with the following results: after two weeks the cured products were completely adhered to the aluminum panels, and exfoliation did not occur even after immersion in water.

COMPARISON EXAMPLES 1 and 2

For Comparison Example 1, a composition was prepared as in Example 1 with the exceptions that the

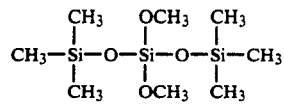

was not added and 50.0 g tetra-n-propoxysilane was used instead of 40.0 g. For Comparison Example 2, a composition was prepared as in Example 1 with the exceptions that 11.4 g Me₂Si(OMe)₂ was used in place of the 20.3 g

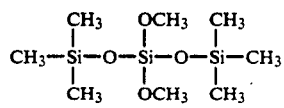

and 37.5 g tetra-n-propoxysilane was used instead of 40.0 g. The snap times of these compositions and their physical properties after curing at room temperature for 2 weeks were measured as in Examples 1-3, and these measurement results are reported in Table 1.

TABLE 1

|  | EXAMPLES ||| COMPARISON EXAMPLES ||
|---|---|---|---|---|---|
|  | 1 | 2 | 3 | 1 | 2 |
| NPOS, g | 40.0 | 35.0 | 30.0 | 50.0 | 37.5 |
| CE, g | 20.3 | 30.5 | 40.6 | — | 11.4 |
| tin catalyst, g | 3.0 | 3.0 | 3.0 | 3.0 | 3.0 |
| snap time, min | 75 | 90 | 90 | 85 | 90 |
| Durometer hardness | 32 | 23 | 15 | 46 | 44 |
| tensile strength, (kg/cm²) | 32 | 30 | 23 | 35 | 34 |
| elongation, (%) | 650 | 960 | 1150 | 450 | 415 |

EXAMPLE 4

A room-temperature-curable elastomer composition was prepared as in Example 3, but in the present case using 50.0 g methyltrimethoxysilane in place of the 30.0 g tetra-n-propoxysilane, 10.0 g diisopropoxybis-(acetylacetonate)titanium in place of the 3.0 g dibutyltin dilaurate, and 60.0 g

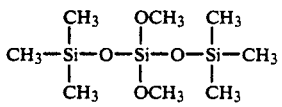

instead of 40.6 g. This composition was cured at room temperature for 2 weeks, and its physical properties were then measured as in Example 3 with the following results: Durometer hardness=21, tensile strength=17 kg/cm², and elongation=940%. This composition could be held uncured in a sealed container for 6 months.

EXAMPLE 5

A room temperature-curable elastomer composition was prepared a in Example 3 using 44.8 g

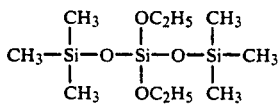

in place of the 40.6 g

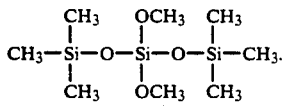

This composition was cured at room temperature for 2 weeks and its physical properties are then measured as in Example 3 with the following results: Durometer hardness=25, tensile strength =31 kg/cm$^2$, and elongation=860%.

Effects of the Invention

Because the room-temperature-curable silicone elastomer composition of the present invention is a combination of components (a) through (d) and in particular because it contains the special siloxane comprising component (b), it has an excellent pre-cure workability and its post-cure properties can be varied over a wide range. In particular, it can produce a low Durometer hardness, high elongation silicone rubber.

That which is claimed is:

1. A modulus controllable room-temperature-curable silicone elastomer composition consisting essentially of
   (a) 100 parts by weight silanol-terminated polydiorganosiloxane that has a viscosity at 25° C of 0.0005 to 0.3 m$^2$/s,
   (b) 0.5 to 20 parts by weight siloxane with the formula

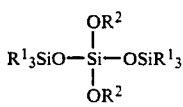

in which R$^1$ represents monovalent hydrocarbon groups and R$^2$ represents monovalent hydrocarbon groups having 1 to 8 carbon atoms,
   (c) 0.5 to 20 parts by weight organosilane with the formula $R^1{}_{4-n}Si(OR^2)_n$ in which R$^1$ and R$^2$ are defined as above and n is 3 or 4 or partial hydrolyzate thereof, and
   (d) 0.01 to 20 parts by weight curing catalyst.

2. The modulus controllable room-temperature-curable silicone elastomer composition in accordance with claim 1 in which R$^1$ is the methyl group.

3. The modulus controllable room-temperature-curable silicone elastomer composition in accordance with claim 1 in which the curing catalyst is a tin compound.

4. The modulus controllable room-temperature-curable silicone elastomer composition in accordance with claim 3 in which the polydiorganosiloxane of (a) is polydimethylsiloxane, the siloxane of (b) has the formula

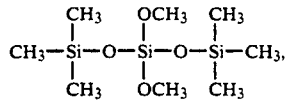

the organosilane of (c) is tetra-n-propoxysilane, and the tin catalyst is dibutyltin dilaurate.

5. The modulus controllable room-temperature-curable silicone elastomer composition in accordance with claim 3 in which the polydiorganosiloxane of (a) is polydimethylsiloxane, the siloxane of (b) has the formula

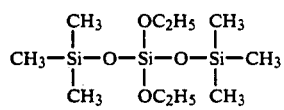

the organosilane of (c) is tetra-n-propoxysilane, and the tin catalyst is dibutyltin dilaurate.

6. The modulus controllable room-temperature-curable silicone elastomer composition in accordance with claim 1 in which the curing catalyst is a titanium compound.

7. The modulus controllable room-temperature-curable silicone elastomer composition in accordance with claim 6 in which the polydiorganosiloxane of (a) is polydimethylsiloxane, the siloxane of (b) has the formula

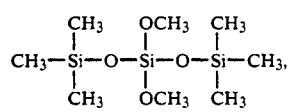

the organosilane of (c) is tetra-n-propoxysilane, and the titanate catalyst is diisoproposybis(acetylacetonate)titanium.

8. A method of making a modulus controllable room-temperature-curable silicone elastomer composition comprising sequentially adding
   (b) 0.5 to 20 parts by weight siloxane with the formula

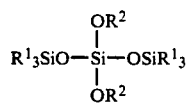

in which R$^1$ represents monovalent hydrocarbon groups and R$^2$ represents monovalent hydrocarbon groups having 1 to 8 carbon atoms, then
   (c) 0.5 to 20 parts by weight organosilane with the formula $R^1{}_{4-n}Si(OR^2)_n$ in which R$^1$ and R$^2$ are defined as above and n is 3 or 4 or partial hydrolyzate thereof, and then
   (d) 0.01 to 20 parts by weight curing catalyst to
   (a) 100 parts by weight silanol-terminated polydiorganosiloxane that has a viscosity at 25° C of 0.0005 to 0.3 m$^2$/s.

9. The method in accordance with claim 8 in which the curing catalyst of (d) is a titanium catalyst.

10. The method in accordance with claim 9 further comprising storing the product of the method in a container sealed from the ingress of atmospheric moisture wherein the composition remains curable when later exposed to atmospheric moisture.

11. A method of making a modulus controllable room-temperature-curable silicone elastomer composition comprising mixing (b) 0.5 to 20 parts by weight siloxane with the formula

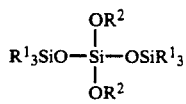

in which $R^1$ represents monovalent hydrocarbon groups and $R^2$ represents monovalent hydrocarbon groups having 1 to 8 carbon atoms, (c) 0.5 to 20 parts by weight organosilane with the formula

in which $R^1$ and $R^2$ are defined as above and n is 3 or 4 or partial hydrolyzate thereof, and (d) 0.01 to 20 parts by weight curing catalyst and thereafter adding the resulting mixture to (a) 100 parts by weight silanol-terminated polydiorganosiloxane that has a viscosity at 25° C of 0.0005 to 0.3 m²/s.

12. The method in accordance with claim 11 in which the curing catalyst of (d) is a titanium catalyst.

* * * * *